United States Patent
Dey et al.

(10) Patent No.: US 8,060,807 B2
(45) Date of Patent: *Nov. 15, 2011

(54) CONTENT AND CHANNEL AWARE OBJECT SCHEDULING AND ERROR CONTROL

(75) Inventors: Sujit Dey, San Diego, CA (US); Debashis Panigrahi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 732 days.

This patent is subject to a terminal disclaimer.

(21) Appl. No.: 11/661,584

(22) PCT Filed: Sep. 1, 2005

(86) PCT No.: PCT/US2005/031515
§ 371 (c)(1),
(2), (4) Date: Sep. 4, 2007

(87) PCT Pub. No.: WO2006/029068
PCT Pub. Date: Mar. 16, 2006

(65) Prior Publication Data
US 2007/0297387 A1    Dec. 27, 2007

Related U.S. Application Data

(60) Provisional application No. 60/606,791, filed on Sep. 2, 2004.

(51) Int. Cl.
*H03M 13/35* (2006.01)
(52) U.S. Cl. .................................................. 714/774
(58) Field of Classification Search .................. 714/774
See application file for complete search history.

(56) References Cited

U.S. PATENT DOCUMENTS

| 6,021,426 A | 2/2000 | Douglis et al. |
| 6,233,713 B1 * | 5/2001 | Van Den Berghe et al. .. 714/790 |
| 6,341,145 B1 | 1/2002 | Hioe et al. |

(Continued)

FOREIGN PATENT DOCUMENTS

EP    1414253    4/2004

(Continued)

OTHER PUBLICATIONS

Mohr et. al., "Unequal Loss Protection: Graceful Degradation of Image Quality over Packet Erasure Channels Through Forward Error Correction", *IEEE Journal on Selected Areas in Communications* vol. 18: No. 6, Jun. 1, 2000, IEEE Service Center, Piscataway, US.

(Continued)

*Primary Examiner* — Stephen M Baker
(74) *Attorney, Agent, or Firm* — Greer, Burns & Crain Ltd.

(57) ABSTRACT

A method and system for wireless data communication. A request is accepted for communication of a data collection including a plurality of data objects. For each of the plurality of data objects, content importance and error resilience properties are evaluated. A transmission order of the data objects is determined based upon evaluated content importance, error resilience properties, past channel conditions and predicted channel conditions, and one or more data objects are selected based on the determined order. An error control level is selected for transmission of data packets for communicating the selected data objects based upon error resilience properties and current channel conditions to achieve communication of the data collection.

27 Claims, 8 Drawing Sheets

U.S. PATENT DOCUMENTS

| | | | |
|---|---|---|---|
| 6,404,923 B1 | 6/2002 | Chaddha | |
| 6,456,607 B2* | 9/2002 | Arai et al. | 370/335 |
| 6,526,038 B1* | 2/2003 | Jain et al. | 370/347 |
| 6,532,220 B1 | 3/2003 | Carneal et al. | |
| 6,587,457 B1 | 7/2003 | Mikkonen | |
| 6,601,009 B2 | 7/2003 | Florschuetz | |
| 6,611,674 B1* | 8/2003 | Jokimies et al. | 455/69 |
| 6,728,270 B1 | 4/2004 | Meggers et al. | |
| 6,742,047 B1 | 5/2004 | Tso | |
| 6,745,364 B2* | 6/2004 | Bhatt et al. | 714/774 |
| 6,859,501 B1* | 2/2005 | Zimmermann et al. | 375/260 |
| 6,882,686 B2* | 4/2005 | Jayant et al. | 375/240.08 |
| 6,892,226 B1 | 5/2005 | Tso | |
| 6,992,983 B1 | 1/2006 | Chatterjee | |
| 6,996,170 B2* | 2/2006 | Thoumy et al. | 375/240 |
| 7,039,120 B1* | 5/2006 | Thoumy et al. | 375/275 |
| 7,277,498 B2* | 10/2007 | Hanaoka et al. | 375/316 |
| 7,289,506 B1* | 10/2007 | Hannuksela | 370/394 |
| 2002/0091794 A1 | 7/2002 | Moran et al. | |
| 2002/0091840 A1 | 7/2002 | Pulier et al. | |
| 2003/0026343 A1 | 2/2003 | Kim et al. | |
| 2003/0110272 A1 | 6/2003 | du Castel et al. | |
| 2003/0174883 A1* | 9/2003 | Krishnan | 382/166 |
| 2003/0229822 A1 | 12/2003 | Kim et al. | |
| 2003/0233445 A1 | 12/2003 | Levy et al. | |
| 2004/0039836 A1 | 2/2004 | Wee et al. | |
| 2004/0049574 A1 | 3/2004 | Watson et al. | |
| 2004/0085989 A1 | 5/2004 | Boumendil et al. | |
| 2005/0216572 A1 | 9/2005 | Tso et al. | |
| 2005/0226196 A1 | 10/2005 | Suh | |
| 2008/0162721 A1* | 7/2008 | Miyake | 709/238 |

FOREIGN PATENT DOCUMENTS

| | | |
|---|---|---|
| JP | 7-123043 A | 5/1995 |
| JP | 7-303090 A | 11/1995 |
| JP | 2004-509423 T | 3/2004 |
| KR | 020020013983 | 2/2002 |
| WO | WO 00/67469 | 11/2000 |
| WO | WO 00/67469 A1 | 11/2000 |
| WO | WO/01/99384 | 12/2001 |
| WO | WO/02/33512 | 4/2002 |
| WO | WO02/056563 | 7/2002 |
| WO | WO2005/050346 | 6/2005 |

OTHER PUBLICATIONS

Song, et al., "Learning block importance models for web pages", International World Wide Web Conference; Proceedings of the 13th International Conference on World Wide Web; Session: Learning Classifiers, p. 203-211, May 22, 2004, New York, NY.

Panigrahi, D., Dey, S., Chaser: Content and Channel Aware Object Scheduling and Error Control for Wireless Web access in 3G Networks, IEEE, 2004, pp. 2119-2123.

Song, R., Liu, H., Wen, J., Ma, W., Learning Block Importance Models for Web Pages, The Thirteenth World Wide Web Conference (WWW 2004), New York, May 2004, pp. 203-211.

Konrad, A., Zhao, B.Y., Joseph, A.D., Ludwig, R., A Markov-Based Channel Model Algorithm for Wireless Networks, In Proc. of Fourth ACM International Workshop on Modeling, Analysis and Simulation of Wireless and Mobile Systems 2001, pp. 1-9.

A. E. Mohr, E. A. Riskin, and R. E. Ladner, "Unequal Loss Protection: Graceful Degradation of Image Quality over Packet Erasure Channels through Forward Error Correction," IEEE Journal on Selected Areas in Communication, vol. 18, 2000, pp. 819-828.

A. Albanese, J. Blomer, J. Edmonds, M. Luby, and M. Sudan, "Priority Encoding Transmission," presented at IEEE Symposium on Foundations of Computer Science, 1994, pp. 604-612.

A. Skodras, C. Christopoulos, and T. Ebrahimi, "The JPEG 2000 still image compression standard," in IEEE Signal Processing Magazine, vol. 18, 2001, pp. 36-58.

J. K. Rogers and P. C. Cosman, "Robust wavelet zerotree image compression with fixed-length packetization," in Proceedings of Data Compression Conference, 1998, pp. 1-10.

A. C. K. Soong, S.-J. Oh, A. D. Damnjanovic, and Y. C. Yoon, "Forward High-Speed Wireless Packet Data Service in IS-2000—1xEV-DV," IEEE Communications Magazine, vol. 41, 2003, pp. 170-177.

M. U. Demircin and Y. Altunbasak, "Finite-Horizon FEC-Rate Adaptation for Real-Time Wireless Multimedia," IEEE Communications Society, 2004, pp. 1770-1775.

U.S. Appl. No. 11/667,203, filed Jul. 12, 2007, Sujit Dey.

U.S. Appl. No. 11/667,404, filed Oct. 25, 2007, Sujit Dey.

Bytemobile Technology: Macara™ Dynamic Optimization Technology, http://www.bytemobile.com/products/macara.html, 2 pages, May 7, 2007.

Venturi Wireless Solutions Technology, http://www.venturiwireless.com/solutions/technology.html, 3 pages, May 7, 2007.

Krintz, Chandra et. al. "Using JavaNws to Compare C and Java TCP-Socket Performance", *Concurrency and Computation: Practice and Experience*, vol. 13, pp. 815-839, 2001.

Ramos, Naomi, et. al., "A Device and Network-Aware Scaling Framework for Efficient Delivery of Scalable Video Over Wireless Networks," *The 18th Annual IEEE International Symposium on Personal, Indoor and Mobile Radio Communications (PIMRC'07)*, IEEE 2007.

"ViewSonic CRT Display Products—Professional Series," ViewSonic Corpo-ration: CRT Display Products, www.viewsonic.com/popup/product/view.

Mohan, Rakesh et. al., "Adapting Multimedia Internet Content for Universal Access", *IEEE Transactions of Multimedia*, vol. 1, No. 1, Mar. 1999.

Office Action in Japanese Patent Application No. 2007-530443 dated Apr. 26, 2011 and English translation thereof.

Ono Masahiro, et al., AII-IP Mobile Wireless Network Architecture (3), IPSJ SIG Notes 2002-MBL-2103, (Mobile Computing and Wireless Communication, 21-3 (May 24, 2002)) and partial English translation thereof.

* cited by examiner

FIG. 7 ized costs for an experiment including
CONTENT AND CHANNEL AWARE OBJECT SCHEDULING AND ERROR CONTROL

PRIORITY CLAIM

This application claims the benefit of U.S. Provisional Patent Application Ser. No. 60/606,791, filed Sep. 2, 2004, under 35 U.S.C. §119.

TECHNICAL FIELD

A field of the invention is wireless communications. A specific, exemplary application of the invention concerns wireless web access in a wireless 3G communications network.

BACKGROUND ART

Web usage, file transfer, multimedia applications, and other popular applications place high demand on data communication networks, calling for strategies to address the bandwidth and error rate demands placed upon channels. Wireless networks have a particularly strong need for communication strategies that address the growing demand for ubiquitous multimedia access. A significant bottleneck in satisfying the increasing demand for content-rich multimedia access is the dynamic error conditions caused by wireless channel variations.

In order to address the above concern, several link and physical layer error control techniques have been proposed that introduce redundancies in transmission to counter the presence of errors. However, due to the redundant data transmission, the physical/link layer techniques may lead to very high communication overhead in terms of the energy consumed and the latency experienced.

A number of adaptation techniques have been proposed to address erroneous transmission in wireless multimedia by using information about specific application object types, such as image and video. One class of techniques is based on Unequal Loss Protection (ULP) framework. In this framework, given a target bandwidth (expressed as the total number of packets), the goal is to protect different parts of the object differently so as to maximize the quality of the data under current channel condition. It is assumed that the channel condition is known a-priori, and is static during the transmission period.

In another class of techniques, called Priority Encoding Transmission (PET), each packet is protected differently at the lower layer using some priority information provided by the higher layer. The advantage of this technique is that it can potentially vary the protection level dynamically as the physical layer channel condition changes. However, such PET techniques do not specify how to optimally assign priorities to different packets based on the changing wireless channel conditions.

DISCLOSURE OF THE INVENTION

Preferred embodiments of the present invention provide, among other things, a method and system for wireless data communication. In a preferred method, a request is accepted for communication of a data collection including a plurality of data objects. For each of the plurality of data objects, content importance and error resilience properties are evaluated. A transmission order of the data objects is determined based upon channel conditions and the evaluated content importance and error resilience properties, and one or more data objects are selected for transmission based on the determined transmission order. For communicating the data objects selected for transmission, an error control level is selected for transmission of data packets based upon the evaluated error resilience properties and the channel conditions.

Another method and system of the present invention is provided for determining an order of wireless transmission for a plurality of data objects. A request is accepted for communication of a data collection including the plurality of data objects. For each of the data objects, content importance and error resilience properties are evaluated. The order of wireless transmission for the data objects is determined based upon channel conditions, the evaluated content importance, and the evaluated error resilience properties. One or more of the plurality of data objects are selected for transmission based on the determined order.

Yet another method and system of the present invention is provided for determining an error control level for one or more data packets of a data object. A request for a data object is accepted, and the data object's error resilience properties are evaluated. An error control level is selected for the one or more data packets of the data object based on the evaluated error resilience properties and current channel conditions to achieve communication of the data packets.

BEST MODE OF CARRYING OUT THE INVENTION

One of the properties of wireless networks is varying channel conditions, often expressed as Bit Error Rate (BER) or Signal to Noise Ratio (SNR), caused by interference from other wireless channels and mobility of wireless devices. While past error control techniques have focused on determining error control level purely based on the experienced channel conditions, preferred embodiments of the present invention target reducing the error control overhead of transmitting different types of objects based on an object's error resiliency as well as current channel conditions. Preferred embodiments of the invention focus on a class of error control methods called forward error control (FEC), where appropriate redundancy is added to a data packet or packets so that the data payload can be correctly decoded at the receiver.

Preferred methods and systems of the present invention intelligently reduce overhead of error control techniques in transmitting different types of data objects, which have different degrees of error resiliency. Different types of data objects, such as different data objects in an accessed web page, have different levels of tolerance to errors. For example, in a web page, an image object can potentially tolerate more errors than a text object. Additionally, different objects contribute different levels of importance to the overall content quality; for example, an image used for navigational purpose in a web-page may have lower importance than other images. As another example, current news content (often located at a top of a web page) may be more important than archival content located farther down on the web page.

Generally, preferred embodiments of the present invention use data properties, namely error resilience and content importance, and the variations in channel conditions, to reduce the cost of data communication, while optimizing quality. Preferably, this is done by transmission order selection and/or error level selection. For each object in a web page, for example, the access cost can be reduced by permitting a certain level of residual error in the object instead of ensuring error-free access. However, as the residual error level is increased, the object's quality degrades depending on the object's error resilience properties. Hence, the residual error level for each object preferably is selected carefully to achieve a desired trade-off between quality and access cost.

Additionally, since achieving the target error level for any object strongly depends on the current channel condition, an object with higher error tolerance can be sent at lower cost under poor channel conditions compared to a low error-resilient object. Hence, the access cost of a web session is reduced in preferred methods and systems by scheduling transmission of objects in an order that best matches the current channel conditions, exploiting the diversity in error resiliency of objects.

Thus, a preferred method and system controls the trade-off between quality and access cost using data characterization to analyze the application data properties, and transmission order selection and error control to decide the schedule of each object's transmission and residual error level at runtime. Experimental results have demonstrated that significant savings can be achieved using an exemplary approach according to embodiments of the invention with minimal loss in quality.

For purposes of illustration, a preferred embodiment will be discussed with regard to a 3rd Generation (3G) wireless data network. We will specifically use examples from 1xEV-DV, an emerging wireless data standard. However, the particular methods and systems of the present invention may be used for other wireless data protocols that provide a mechanism to change the error control level dynamically.

To cope with diverse channel conditions, the 1xEV-DV standard introduces techniques to dynamically adapt modulation, channel coding, and packet length in the physical layer. An adaptation algorithm tries to select a combination of modulation scheme, channel coding, and packet size to keep the packet error rate less than 1%. For channel coding, the physical layer uses a base 1/5-rate turbo encoder to generate different strengths of channel coding with appropriate puncturing and truncation, to produce different error coding levels. In the preferred embodiments described, the adaptive channel coding is used to dynamically change the strength of error protection.

Figure 1:
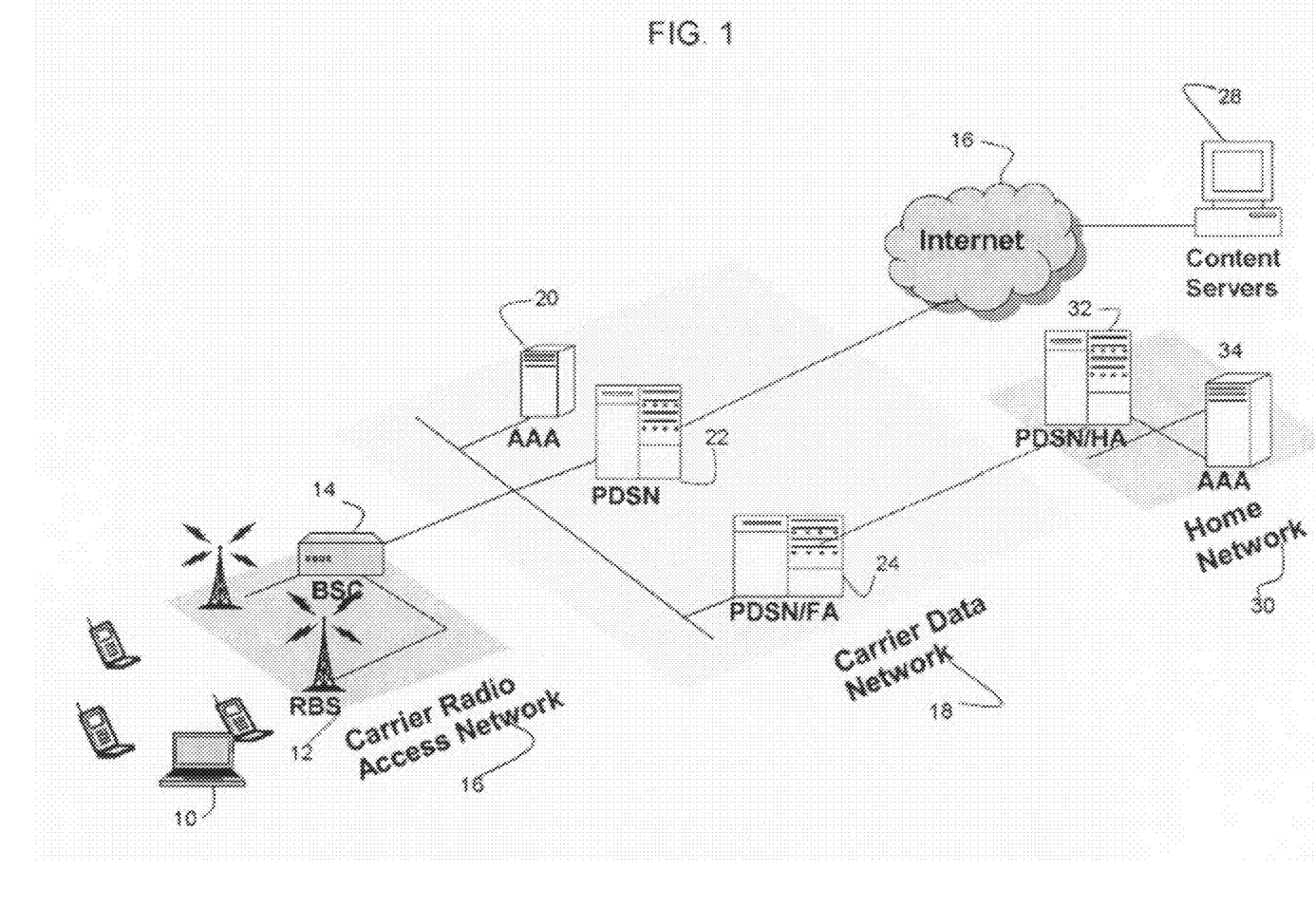
FIG. 1 shows an exemplary wireless architecture for use with a transmission order selection and error level selection system and method of embodiments of the present invention.

Referring now to the drawings, a wireless network is shown in FIG. 1 for which exemplary methods and systems of the present invention may be used. Each mobile station including one or more users or clients 10 is associated with a Radio Base Station (RBS) 12 and connected, for example, via wireless radio protocols as known by those of ordinary skill in the art. A set of the RBSs 12 are controlled by a Base Station Controller (BSC) 14. The BSC 14 implements radio resource management functionalities including mobile handoffs between different RBSs, power control, scheduling of data, etc.

The RBS 12 and BSC 14 form a carrier radio access network 16, which provides access for the wireless users 10. A carrier data network 18 is linked to the carrier radio access network 16, and may include an authentication, authorization, and accounting (AAA) system 20, a packet-data serving node (PDSN) 22, and a packet-data serving node foreign agent (PDSN/FA) 24.

For data communications, the Packet Data Service Node (PDSN) 22 is a special node that acts as a gateway to the wired internet 26, and can substitute as a foreign agent for mobile-IP based implementation. Additionally, the PDSN 22 can act as a proxy server between the wired and wireless world, implementing many important tasks such as content adaptation and transcoding for wireless data, split-transport protocol, etc. Content servers 28 supply web data content to the internet 26. The PDSN/FA 24 may be linked to a home network 30, including a packet-data serving node home access (PSDN/HA) 32, itself linked with an AAA 34.

Figure 2:
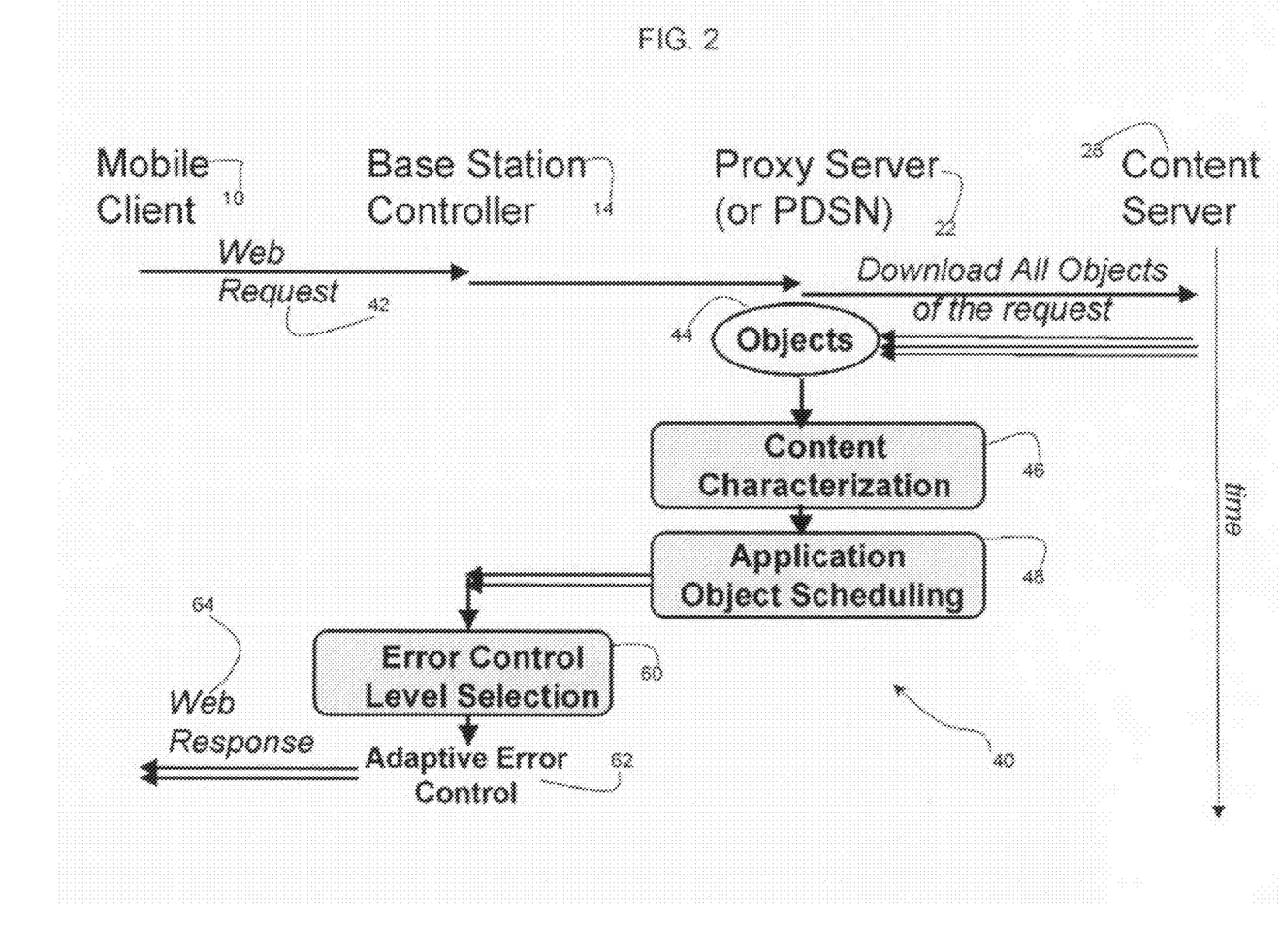
FIG. 2 shows an exemplary architecture for a transmission order selection and error level selection system.

An overall framework of an exemplary object scheduling and error control system is shown in FIG. 2. The exemplary system 40 uses a proxy-based architecture with a proxy server co-located with the PDSN 22. Generally, when the client 10 makes a document (e.g., web page) request 42, the proxy server 22 downloads all constituting objects 44 of the web page, i.e. image, video and HTML files, from the content server 28. The objects 44, for example, may be stored within a cache. Next, a content and data characterization module 46 in the proxy server 22 analyzes the web page and the objects 44 to evaluate the content importance and estimate error resilience properties for each object.

An application object scheduling module 48 then decides the order of the objects' transmission using the past channel conditions and the predicted channel conditions for the future. The channel condition information used to provide the past and predicted channel conditions is accessed from the BSC 14. The BSC 14 receives physical layer channel information (e.g., signal-to-noise ratio (SNR)) for every active data session using the feedback control channels as specified in the wireless radio standards, i.e. 3GPP.

Given the channel condition estimates, specified as the Bit Error Rate (BER) and using the object properties from the content and data characterization module 46, an error control level selection module 60 in the BSC 14 selects appropriate error levels for the packets of the selected objects to achieve a desired trade-off between access cost and content quality. An adaptive error control module 62 employing an algorithm in the physical layer uses the information provided by the error level selection module 60 in the upper layer to choose appropriate channel coding. A web response 64 is then forwarded to the client 10.

Figure 3:
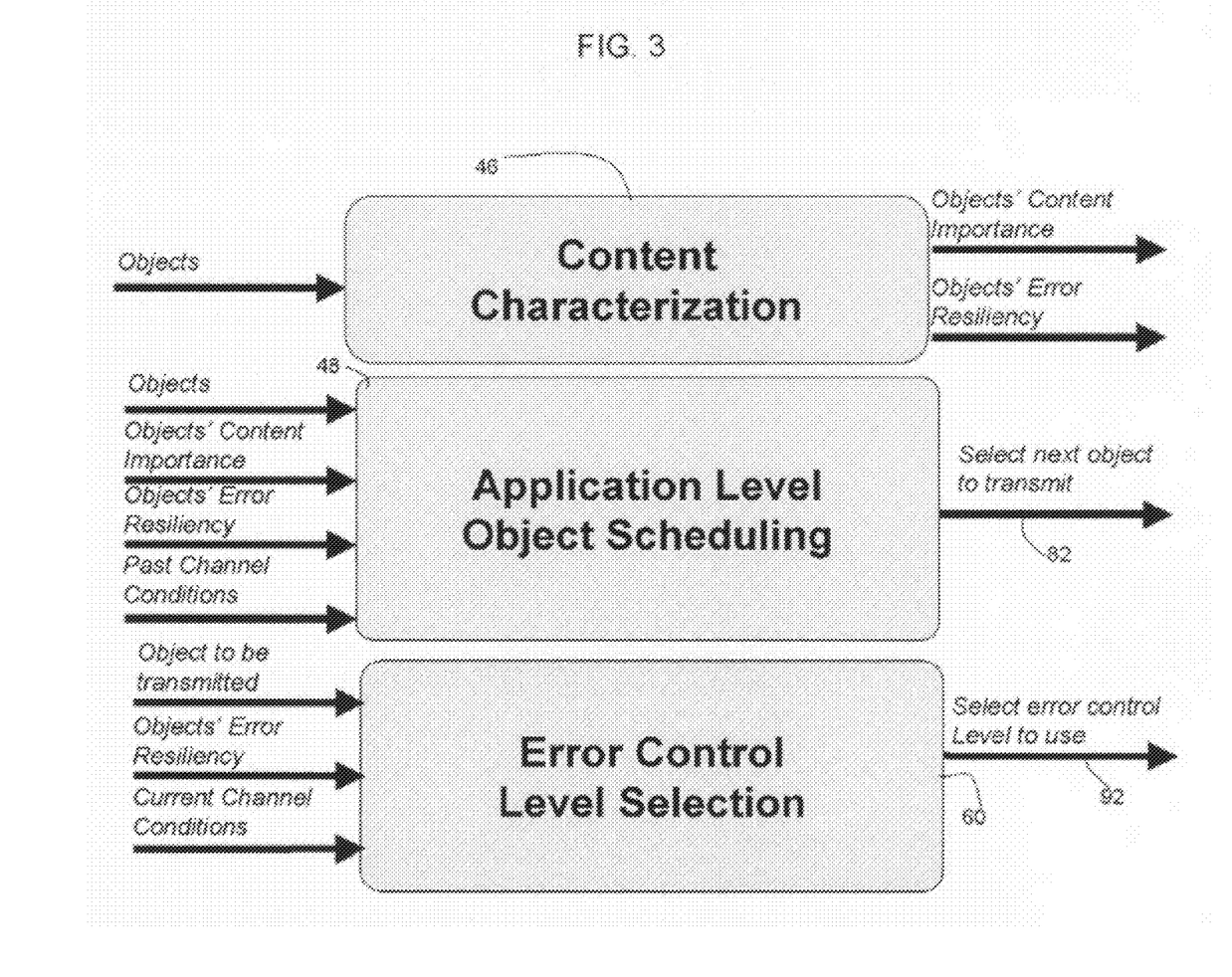
FIG. 3 shows an exemplary input/output interface for a transmission order selection module and an error control selection module according to embodiments of the present invention.

Referring also to FIG. 3, operation of the content and data characterization module 46 will now be described in more detail. The content and data characterization module 46 can use any available content analysis module for the objects 44 to determine application-level data properties, particularly the objects' content importance and error resiliency. In certain embodiments, the content importance can be explicitly provided by the service provider as a tag along with the content of the object 44. For example, in a webpage, one can associate a <METADATA> tag with an <IMG> object to provide relative importance of this image in comparison to other objects present in the web page. Other embodiments can use any type of machine learning algorithm, such as that described in Ruihua Song, Haifeng Liu, Ji-Rong Wen, and Wei-Ying Ma, Learning Block Importance Models for Web Pages, The Thirteenth World Wide Web Conference (WWW 2004), pp. 203-211, New York, May, 2004, to analyze the content and estimate the importance of different objects. For example, in a news web page, the central article may have the most importance compared to other categorized headlines.

To evaluate the error resiliency of an object, preferred embodiments of the present invention use a lookup table to estimate quality degradation with different residual error levels based on the object's compression type, format, and the compression parameters used. The lookup table is constructed from simulations with multiple sets of representative data. In the lookup table, for expressing quality degradation for different objects, preferred embodiments use the Peak-Signal-to-Noise-Ratio (PSNR) for image and video objects. For the text objects, a ratio referred to herein as a Correct-to-Total-Words-Ratio (CTWR) preferably is used. The CTWR is defined as the ratio between correct words and the total number of words present in a text object.

Thus, in a preferred embodiment, as an output of the content and data characterization module 46, each object 44 is associated with two metadata information: (1) Content Importance (QC) and (2) Error Resiliency. In an exemplary embodiment, the content importance is expressed by a number between 1 and 100, where the sum of all object's QC should be 100. The error resiliency preferably is expressed by a table, called ErrorResiliencyTable, containing tuples (RE, QD), where RE expresses the permissible residual error levels, and QD represents the effect on the quality degradation (e.g., PSNR or CTWR) for the residual error levels. For example, the error resiliency of an image object can be represented as (RE, QD)={(0.00001, 23), (0.0001, 22), (0.001, 21)}, where in each tuple, the first element expresses the residual error level in terms of BER and the second element is the resultant quality of image measured by the PSNR metric and expressed in dB units.

Given the metadata for an object and past channel conditions, the application object scheduling module 48 schedules objects for transmission. Then, given the object to be transmitted, the objects' error resiliency, and current channel conditions, the error level selection module 60 decides residual error level for data packets of each object. The goal in preferred embodiments is to reduce the access cost of a data communication (for example, a web session) while affecting the overall content quality minimally.

Next, we present motivation behind the methods presented in the invention, using a mathematical formulation to achieve optimal trade-off between content quality and content transmission and error control while transmitting a plurality of data objects using a wireless communication medium. For illustration, we will use wireless web access as an example application. Assume that a web session, W, includes accesses to N different objects. The content importance of an object i is denoted as $QC_i$, and the error resiliency is expressed by the tuple ($RE_i$ and $QD_i$) as explained earlier. The overall content access quality (Q) can be expressed as the weighted sum of all objects' qualities, i.e. Q=sum($QC_i * Q_i$) where $Q_i$ is the quality (e.g., PSNR or CTWR) of the object at the receiver. Similarly, the access cost can be expressed as C=sum($C_i$) where $C_i$ represents the cost of receiving the $i^{th}$ object at the receiver. The cost $C_i$ is expressed as the total time spent or the total number of bytes transmitted, which directly affects the latency or energy consumption. This cost is determined offline to produce a pre-characterized table of overheads for different error control levels supported by the communication standards.

To represent the schedule of each object transmission, an exemplary method uses an array of binary numbers S, where, for example S(i, j)=1 indicates that the $i^{th}$ object is under transmission at the $j^{th}$ slot. The residual error level selected for object i is expressed by $ET_i$ where $ET_i$ is the index to the array $RE_i$ and $QD_i$. A slotted mode of transmission is assumed in the analysis. Assume the maximum number of slots required to send all N objects is MS. To represent channel condition, we associate an array CC of size MS where $CC_j$ represents the channel condition (e.g., SNR) experienced in the $j^{th}$ slot. The effect of channel coding on overhead cost and the residual error level is represented by a matrix CostEC, of dimension C×M, where C is the number of disjoint channel conditions considered and M is the number of possible error levels. The CostEC is a simulation model, called ErrorControlDB, developed offline, which captures the cost of achieving the error level of an object using the adaptive error control mechanisms available in the 1xEV-DV standard assuming an Adaptive White Gaussian Noise (AWGN) channel model. The ErrorControlDB is available as part of the physical layer specifications of wireless data standards.

To achieve the tradeoff between cost and quality of content, exemplary methods use a utility-based maximization problem, where the utility function UtilityFunction captures the intended priority between quality and cost. The appropriate utility function can be decided by the user, such as an operator deploying the techniques. Some examples of utility functions that can be used are Q/Cα and Q-αC, where α is a positive valued real number. The formal formulation of the optimization problem is shown below:

$$\text{maximize} \quad U(Qual, Cost)$$

where $$Qual = \sum_{i=1}^{N} QC_i * Q_i \quad\quad Cost = \sum_{i=1}^{N} C_i$$

$$1 \leq ET_i \leq size(RE_i) \quad \forall i$$

$$Q_i = QD_i(ET_i) \quad \forall i$$

$$C_i = \sum_{j=1}^{MS} S(i, j) * CostEC(CC(j), RE_i(ET_i)) \quad \forall i$$

$$\sum_{i=1}^{N} S(i, j) = 1 \quad \forall j$$

In this formulation, the goal is to maximize the utility (U) function by selecting an optimal residual errol level $ET_i$ for object i and slot S(i,*) for object i under the following constraints: (1) residual error level ($ET_i$) for each object must be less than the maximum tolerable error level, and (2) only one object can be scheduled for transmission per slot (shown as the last constraint above). The quality degradation of the object ($Q_i$) is decided by $ET_i$, and the cost ($C_i$) is affected by residual error level ($ET_i$), schedule of transmission (S), and the channel condition (CC) experienced during its transmission.

Figure 4:
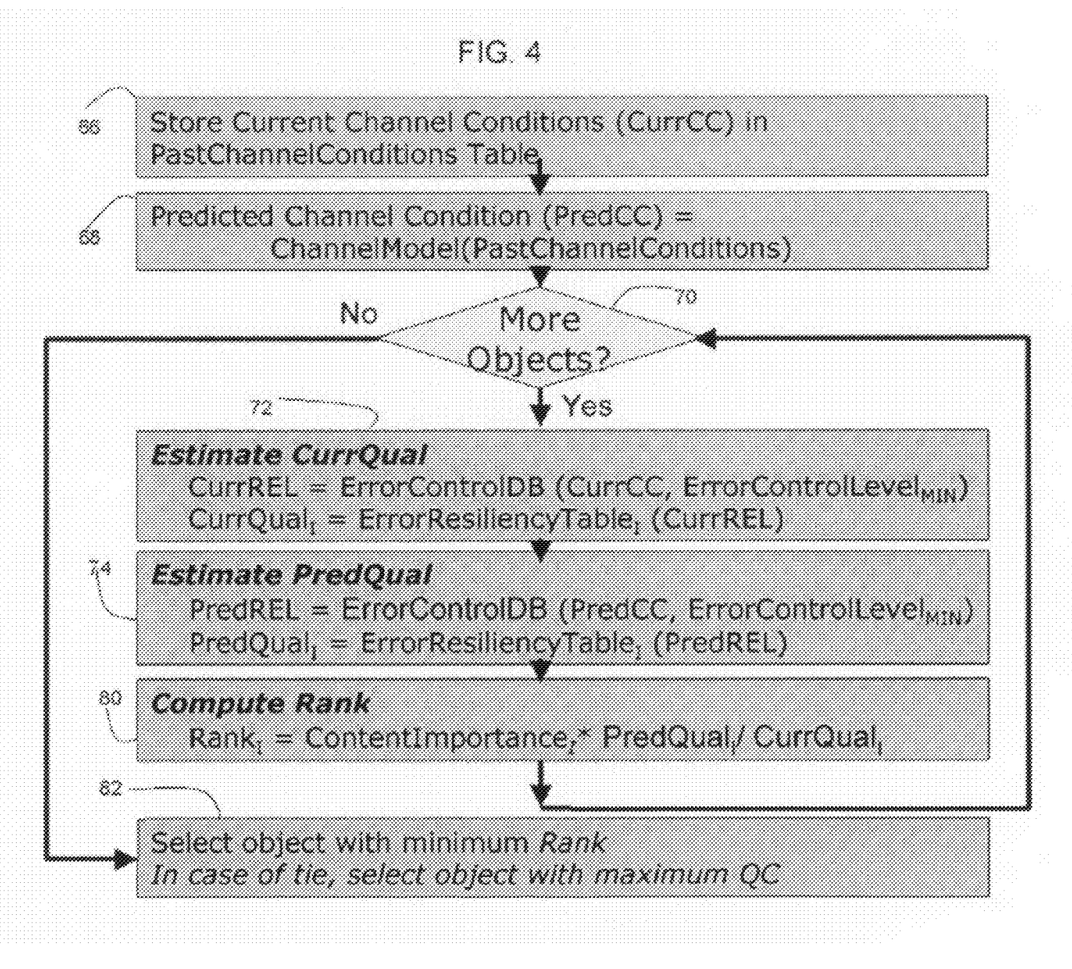
FIG. 4 shows steps in an exemplary transmission order selection method.
Figure 5:
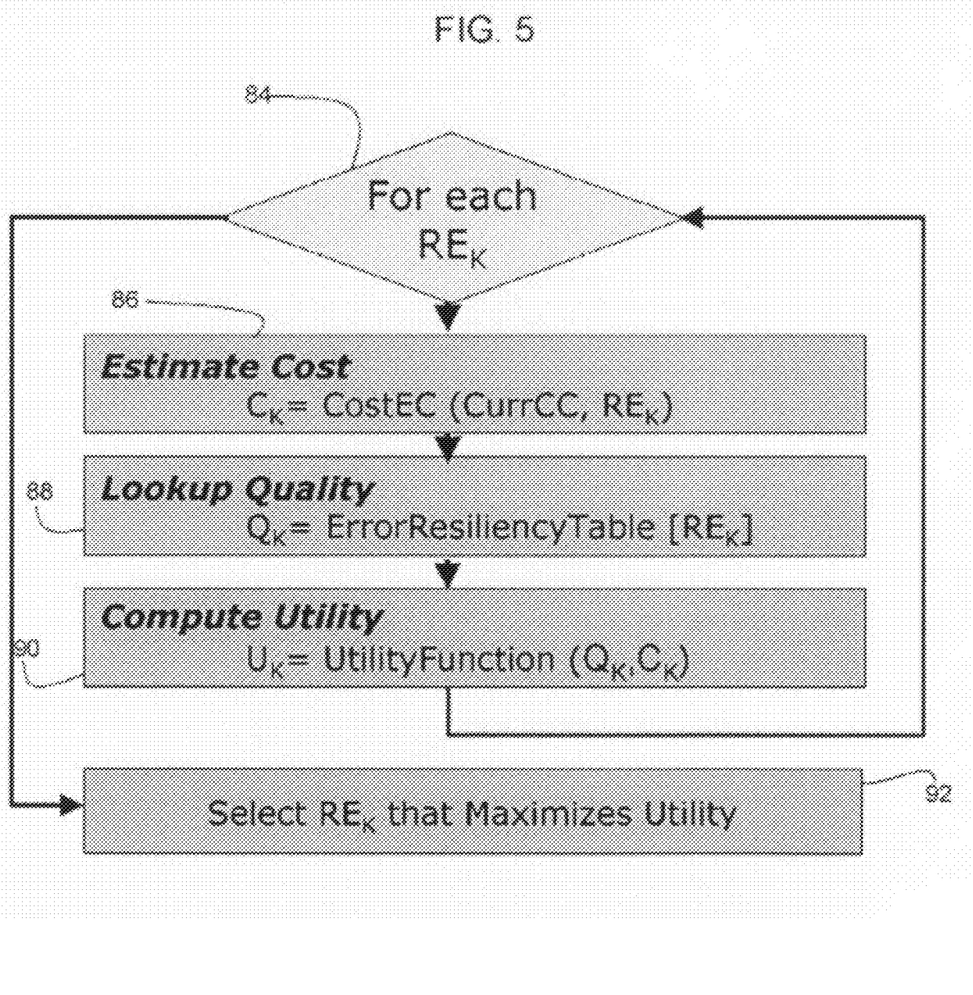
FIG. 5 shows steps in an exemplary error level selection method.

The above optimization can be solved using Lagrangian methods, but will have very high complexity to be computed at runtime. Hence, a preferred method simplifies the problem by splitting the decisions into two phases: one for deciding transmission order of objects, referred to herein as Application Object Scheduling (AOS), which is performed by the application object scheduling module 48; and the other for determining the target residual error level, referred to herein as Error Level Selection (ELS), which may be performed by the error control level selection module 60 in the BSC 14. If the Lagrangian methods mentioned above are used instead, the decision about the error level is performed at the PDSN 22. The use of Lagrangian methods may lead to an inferior solution, however, because the PDSN 22 receives delayed feedback about the channel conditions, hence optimization may be sub-optimal. Flowcharts of exemplary algorithms used to solve the above two steps are shown in FIG. 4 and FIG. 5. The goal of AOS is to exploit the slow variations in the channel conditions by matching scheduling of objects to channel variations, whereas ELS tracks to the faster variations in the channel conditions (such as multi-path fading) by dynamically changing the error target levels.

For AOS, the exemplary application object scheduling module 48 restricts the scheduling problem to allow a serialized transmission schedule of objects. After transmission of any object 44, a heuristic algorithm is used to select the next object for transmission. The heuristic is to select an object which has high error tolerance level (i.e. less degradation in quality under high residual error) under bad channel conditions and vice versa.

In this exemplary scheme, we store (step 66) current channel conditions (CurrCC) in a table, called PastChannelConditions, which is used to predict future channel conditions. An exemplary method predicts future channel conditions (step 68) using a Markov-based model, called ChannelModel, to predict channel conditions based on the past samples in PastChannelConditions (similar to the Finite State Channel used in Almudena Konrad, Ben Y. Zhao, Anthony D. Joseph, and Reiner Ludwig, A Markov-Based Channel Model Algorithm for Wireless Networks, In Proc. Of Fourth ACM International Workshop on Modeling, Analysis and Simulation of Wireless and Mobile Systems, 2001).

Generally, the AOS module 48 then determines a rank for each object. For each object (step 70), we predict quality of each object (CurrQual) if the object is transmitted under current channel conditions using the minimum error control level. In order to predict quality, we first evaluate (step 72) the residual error level (CurrREL) if the minimum error control level (ErrorControlLevel$_{MIN}$) is used under current channel condition using the error control database (ErrorControlDB) that characterizes the effectiveness of each error control level. Using the residual error level CurrREL, we estimate the quality (CurrQual$_i$) of the object using the ErrorResiliencyTable of the object generated in the content characterization step (module 46). Similarly, we estimate (step 74) the quality of each object (PredQual$_i$) if the object is transmitted using the predicted channel condition information PredCC using similar steps for estimating CurrQual.

Next, for each object, the application object scheduling module 48 computes a rank (step 80) defined as the ratio of the predicted quality (PredQual) and quality under current conditions (CurrQual) weighted by the content importance of the object. Once all of the objects have been evaluated (step 70), the object with minimum rank is selected for transmission (step 82). If two objects have equal rank, the object with maximum content importance QC is selected for transmission. After an object is selected, the object scheduling process (steps 70, 72, 74, 80, and 82) begins again with the remaining objects.

Once the object has been selected for transmission (step 82), the error level selection module 60 selects the residual error level using a maximal ascent approach. In a preferred scheme, for each residual error level RE$_K$ (step 84), the error level selection module 60 computes (step 86) an estimate for the cost C$_K$ of ensuring the residual error level under current channel condition CurrCC using the cost matrix CostEC. The error level selection module 60 also determines (step 88) the effect Q$_K$ on that object's quality for the residual error level RE$_K$ using the ErrorResiliencyTable generated by the content characterization module 46. Based on the computed quality Q$_K$ and cost combination C$_K$ for each error level, an object utility U$_K$ is computed (step 90) according to the UtilityFunction that is desired to be used, as described above. When U$_K$ for each residual error levels is determined (step 84), the error selection module 48 selects (step 92) the error level RE$_K$ (the target error level) that maximizes the overall utility.

The error level RE$_K$ is sent to the physical layer module (adaptive error control 62) that decides the error control methods for transmitting the data packets for the selected object. The adaptive error control 62 then may perform the error control methods according to the selected error control level, and the Web response 64 is transmitted wirelessly to the client 10. The process (steps 84, 86, 88, 90, and 92) may be repeated for all data packets for the selected object. Alternatively, the process may be performed once for all packets of the selected object.

An experimental evaluation of this exemplary approach will now be described. We developed a MATLAB based simulation framework to implement the exemplary transmission order selection and error selection method and compared the method with other existing approaches. The simulation framework takes three inputs: (1) a SNR trace file representing the channel condition generated from a very accurate physical simulation environment called RUNE; (2) a pre-characterized table expressing the relationship between the residual bit error rate, current channel condition and the channel coding level, (3) application data properties. Different channel conditions are generated by varying the distance of the mobile node from the base station and its velocity. In our current simulation, we assume a delayed channel condition feedback (delay of 50 ms) and use the input network condition generated by RUNE. In the rest of this section, we express different channel conditions by D_V, where D is the distance (km) of the mobile from the base station and V is velocity (m/s) of the mobile.

For our experiments, we chose a simplified news webpage from CNN that has four embedded objects, two images and two text objects. We characterized each of the objects in terms of error resiliency and content importance properties as explained above, and used the properties as an input to our simulation.

In our evaluation, the error-control schemes we consider are (1) Static FEC, where a fixed FEC (Forward Error Control) strength is used (turbo coder with coding rate 0.8); (2) Adaptive FEC, similar to the scheme currently being proposed in the 1xEV-DV standard; (3) error level selection according to an embodiment of the invention, without application object scheduling (ELS); and (4) error level selection, with application object scheduling, according to embodiments of the present invention (AOS-ELS).

Figure 6:
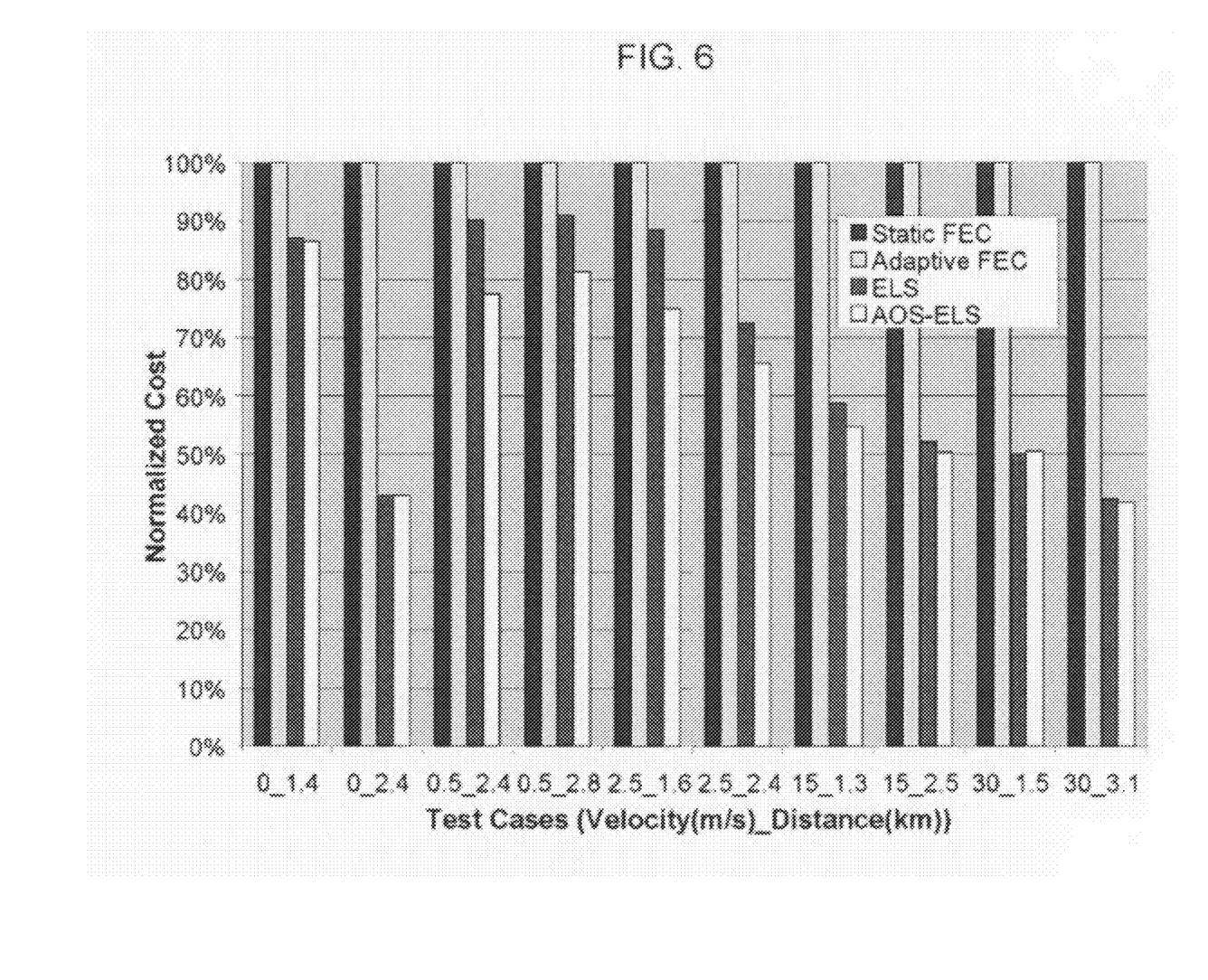
FIG. 6 shows normalized costs for an experiment including various error control techniques, including techniques according to embodiments of the present invention.
Figure 7:
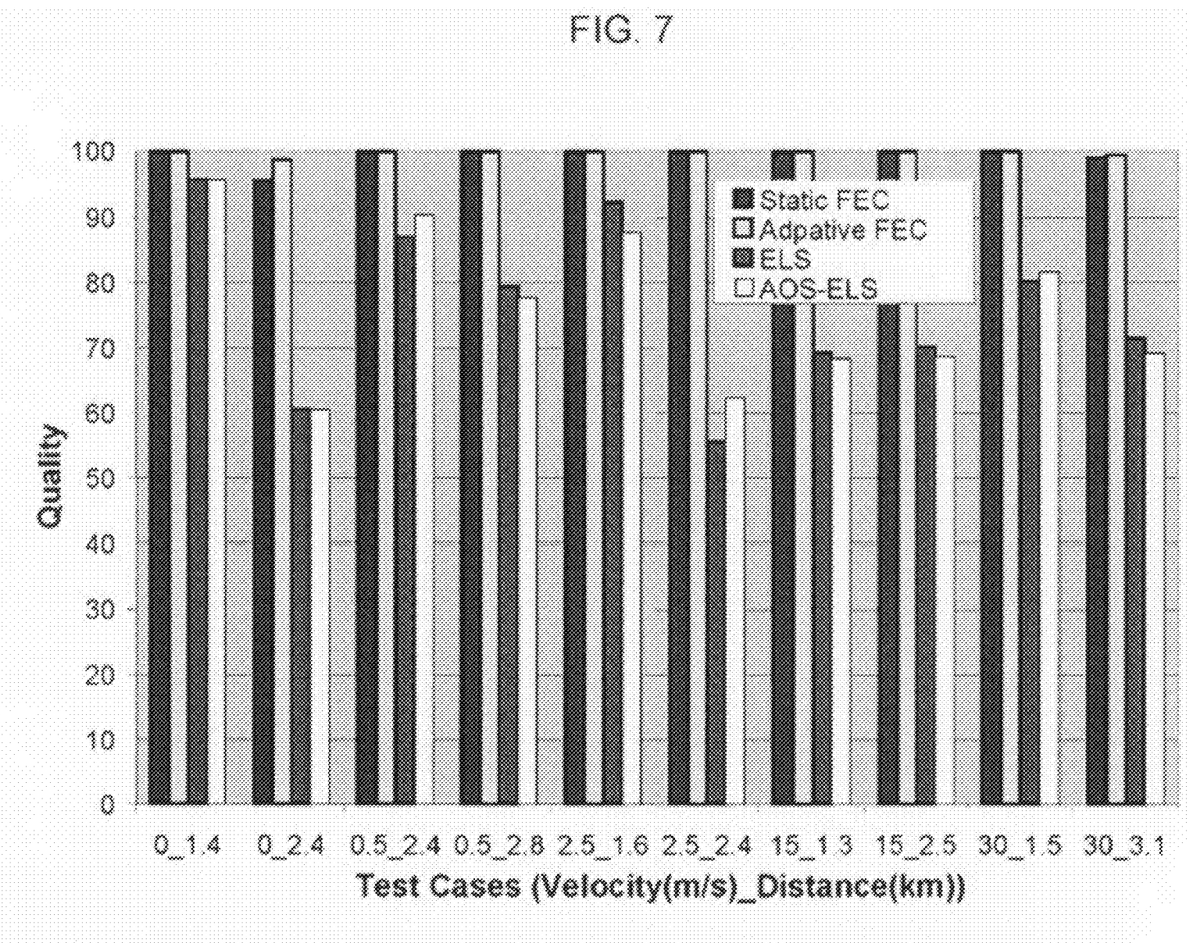
FIG. 7 shows a quality comparison among various error control techniques.
Figure 8:
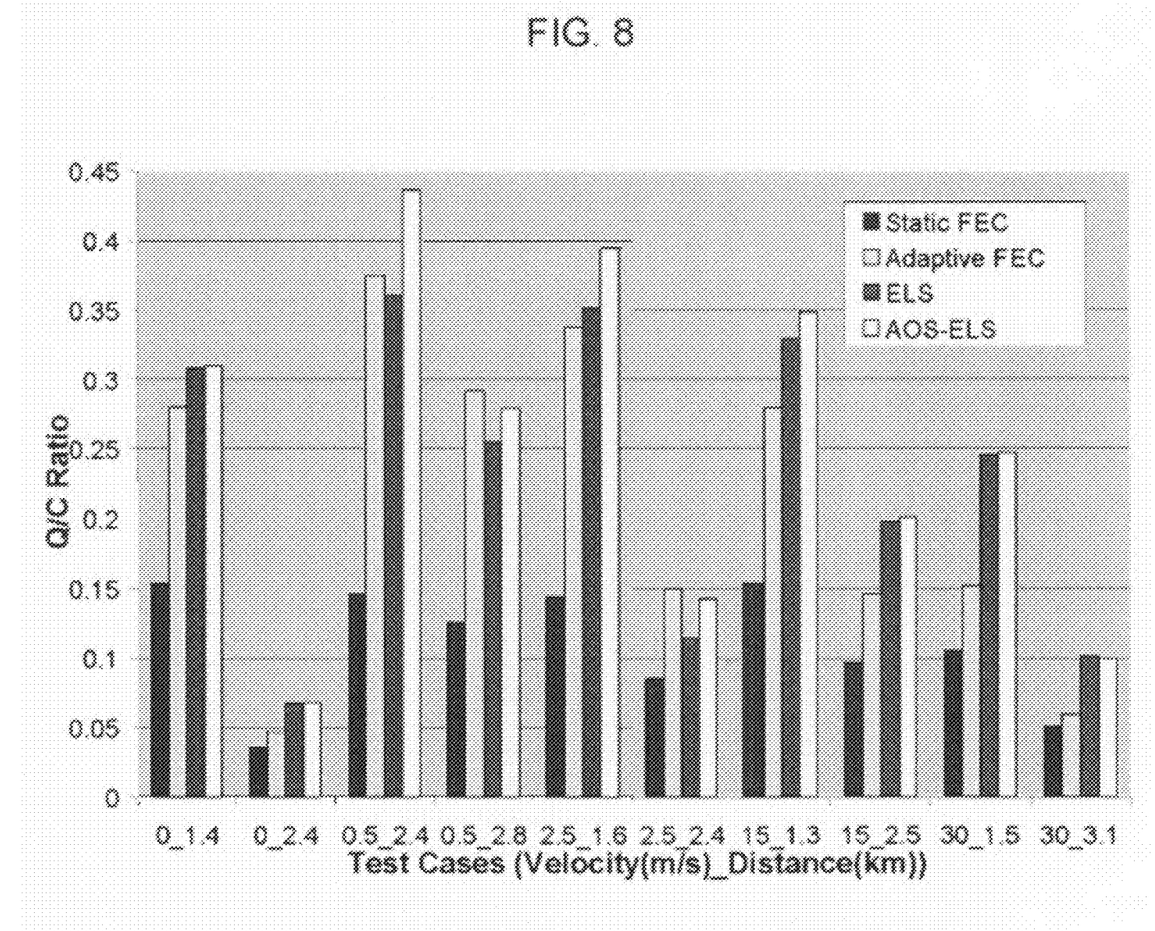
FIG. 8 shows a quality/cost comparison among various error control techniques.

FIG. 6, FIG. 7, and FIG. 8 present a comparative evaluation of the above error control schemes under different channel conditions in terms of Cost, Quality, and Quality/Cost respectively. The figures present averaged results over twenty-five simulations. In each figure, the channel condition is represented by different-test cases with varying mobility and distance from the base station. For this comparison, we use an utility function U(Q,C)=Q/C$^3$ that gives more importance to cost than quality.

It can be seen from FIG. 6 that exemplary embodiments of the present invention, i.e. ELS and AOS-ELS, lead to a significant savings in the access cost, up to a maximum saving of 59.3% (for channel condition 0_2.4), and an average saving of 37.4%. By comparing the last two bars in the bar plot for each test case, it can be seen that scheduling is more effective at moderate mobility conditions, i.e. when the mobile's velocity is in the range of 0.5 m/s to 15 m/s. This can be explained as follows. For low mobility channel conditions, the scheduling gain is minimal since the channel conditions experienced by each object are similar. By contrast, for the high mobility test cases, it is difficult to predict and take advantage of the high variations in the channel conditions at an object level. In achieving the cost reduction, the quality of the web access is reduced. As seen from FIG. 7, the AOS-ELS scheme leads to a quality degradation of 20% on average. In order to compare the quality and cost together, we plot the Q/C ratio achieved by different schemes (FIG. 8). It can be seen that our approach leads to higher Q/C for most of the test cases.

Since the AOS-ELS framework's scheduling functionality depends on the accuracy of the channel prediction, we compared our results with an ideal solution where we assume that the knowledge of future channel condition is available. Our results show that the deviation from the ideal solution increases with the increase in the mobility, and has a maximum offset of 14.4%. Therefore, it is important to note that using a better channel prediction may reduce the error margin, and hence lead to a better solution.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, as set forth in the appended claims.

Various features of the invention are set forth in the appended claims.

The invention of claimed is:

1. A method for wireless data communication, the method comprising:
   accepting a request for communication of a data collection including a plurality of data objects;
   for each of the plurality of data objects, evaluating content importance and error resilience properties;
   determining a transmission order of the data objects based upon channel conditions, content importance and error resilience properties;
   selecting one or more data objects for transmission based on the determined transmission order;
   selecting an error control level for transmission of at least one data packet for communicating the selected data objects based upon the error resilience properties and the channel conditions.

2. The method of claim 1, wherein said determining a transmission order is performed in real time.

3. The method of claim 1, wherein said selecting error control levels is performed in real time.

4. The method of claim 1, wherein said evaluating content importance comprises at least one of reading a tag received with the data object and employing a learning algorithm to analyze content of the data object.

5. The method of claim 1, wherein said evaluating error resilience properties comprises extracting at least one error resilience level from a lookup table based on at least one of the data object's compression type, the data object's format, and compression parameters used for compressing the data object.

6. The method of claim 1, wherein said determining a transmission order is based on the evaluated content importance, the evaluated error resilience properties, and past channel conditions.

7. The method of claim 1, further comprising:
   forwarding the selected error control level to an adaptive error control;
   performing an error control method on the selected data object based on the selected error control level;
   transmitting a Web response to the request including the selected data object upon which the error control method was performed.

8. The method of claim 1, wherein said selecting an error control level is based on the evaluated error resilience properties and current channel conditions.

9. The method of claim 8, wherein said selecting an error control level comprises:
   for a plurality of residual error levels, determining an effect on the selected object's quality and a cost of ensuring a residual error level under a current channel condition;
   based on the determined effect and cost, selecting a residual error control level that maximizes the selected object's utility according to a utility function.

10. The method of claim 1 wherein said determining a transmission order comprises, for each of the plurality of data objects, determining a rank based on content importance, predicted quality under predicted channel conditions, and estimated current quality under current channel conditions; and
    wherein said selecting a data object is based on the determined rank.

11. The method of claim 10 wherein said determining a rank comprises:
    computing a ratio of the predicted quality to the estimated current quality;
    weighting the ratio by the content importance to determine the rank.

12. The method of claim 10 wherein said determining a rank comprises:
    estimating the predicted quality by predicting the residual error level at a minimum error control level used under a predicted channel condition and determining the predicted quality at the predicted residual error level based on the evaluated error resilience properties;
    estimating the current quality by estimating a residual error level at a minimum error control level used under current channel conditions and determining the current quality at the estimated residual error level based on the evaluated error resilience properties;
    computing a ratio of the predicted quality to the estimated current quality;
    weighting the ratio by the content importance to determine the rank.

13. The method of claim 12, further comprising:
    determining the predicted channel condition based on past channel conditions.

14. A method for determining an order of wireless transmission for a plurality of data objects, the method comprising:
    accepting a request for communication of a data collection including the plurality of data objects;
    for each of the plurality of data objects, evaluating content importance and error resilience properties; and determining the order of wireless transmission of the data objects based upon channel conditions, the evaluated content importance, and the evaluated error resilience properties;

selecting one or more of the plurality of data objects for transmission based on the determined order.

15. The method of claim 14, wherein said determining is performed in real time.

16. The method of claim 14, wherein said evaluating content importance comprises at least one of reading a tag received with the data object and employing a learning algorithm to analyze content of the data object.

17. The method of claim 14, wherein said evaluating error resilience properties comprises extracting at least one error resilience level from a lookup table based on at least one of the data object's compression type, the data object's format, and compression parameters used for compressing the data object.

18. The method of claim 14 wherein said determining the order comprises, for each of the plurality of data objects, determining a rank based on content importance, predicted quality under predicted channel conditions, and estimated current quality under current channel conditions; and wherein said selecting a data object is based on the determined rank.

19. The method of claim 18 wherein said determining a rank comprises:

computing a ratio of the predicted quality to the estimated current quality;

weighting the ratio by the content importance to determine the rank.

20. The method of claim 18 wherein said determining a rank comprises:

estimating the predicted quality by predicting the residual error level at a minimum control level used under a predicted channel condition and determining the predicted quality at the predicted residual error level based on the evaluated error resilience properties;

estimating the current quality by estimating a residual error level used under current channel conditions and determining the current quality at the estimated residual error level based on the evaluated error resilience properties;

computing a ratio of the predicted quality to the estimated quality;

weighting the ratio by the content importance to determine the rank.

21. The method of claim 20 further comprising:

determining the predicted channel condition based on past channel conditions.

22. A method for determining an error control level for one or more data packets of a data object, the method comprising:

accepting a request for a data object;

evaluating the data object's error resilience properties;

selecting an error control level for the one or more data packets of the data object based on the evaluated error resilience properties and current channel conditions to achieve communication of the data packets.

23. The method of claim 22, wherein said selecting is performed in real time.

24. The method of claim 22, wherein said evaluating error resilience properties comprises extracting at least one error resilience level from a lookup table based on at least one of the data object's compression type, the data object's format, and compression parameters used for compressing the data object.

25. The method of claim 22, wherein said selecting an error control level comprises:

for a plurality of residual error control levels, determining an effect on the data object's quality and a cost of ensuring a residual error level under a current channel condition;

based on the determined effect and cost, selecting a residual error control level that maximizes the selected object's utility according to a utility function.

26. A system for wireless data transmission comprising:

a content characterization module that evaluates content importance and error resilience properties of a plurality of data objects;

a transmission order determining module that determines a transmission order of the plurality of data objects based on channel conditions, content importance, and error resilience properties, and selects one or more data objects for transmission based on the determined transmission order; and an error control level selection module that selects an error control level for data packets of the selected data objects based on the error resilience properties and the channel conditions to achieve communication of the data packets.

27. The system of claim 26 further comprising:

an adaptive error control module that performs an error control method on the selected data object based on the selected error control level.

* * * * *